United States Patent
Nakahara et al.

(10) Patent No.: US 10,871,959 B2
(45) Date of Patent: Dec. 22, 2020

(54) VEHICLE CONTROL DEVICE AND PROGRAM UPDATE SYSTEM

(71) Applicant: HITACHI AUTOMOTIVE SYSTEMS, LTD., Hitachinaka (JP)

(72) Inventors: Fumiharu Nakahara, Tokyo (JP); Kenichi Kurosawa, Tokyo (JP); Hajime Araki, Tokyo (JP); Hidetoshi Teraoka, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/345,753

(22) PCT Filed: Jan. 17, 2018

(86) PCT No.: PCT/JP2018/001141
§ 371 (c)(1),
(2) Date: Apr. 29, 2019

(87) PCT Pub. No.: WO2018/139296
PCT Pub. Date: Aug. 2, 2018

(65) Prior Publication Data
US 2019/0265967 A1    Aug. 29, 2019

(30) Foreign Application Priority Data
Jan. 25, 2017  (JP) ................... 2017-010806

(51) Int. Cl.
*G06F 8/654* (2018.01)
*B60W 50/00* (2006.01)
(Continued)

(52) U.S. Cl.
CPC .............. *G06F 8/654* (2018.02); *B60R 16/02* (2013.01); *B60W 50/00* (2013.01); *G06F 8/65* (2013.01);
(Continued)

(58) Field of Classification Search
CPC . G06F 8/654; G06F 8/65; B60R 16/02; B60R 16/0231; B60W 50/00; B60W 2050/0077; B60W 2050/0083
(Continued)

(56) References Cited

U.S. PATENT DOCUMENTS 5,189,617 A * 2/1993 Shiraishi ............... B60W 50/00
701/48
9,141,535 B2 * 9/2015 Kondoh ............... G06F 12/0246
(Continued)

FOREIGN PATENT DOCUMENTS

JP  2004-046453 A  2/2004
JP  2006-301960 A  11/2006
(Continued)

OTHER PUBLICATIONS

Esen et al, "Control as a Service (CaaS) Cloud-based Software Architecture for Automotive Control Applications", [Online], 2015, pp. 13-18, [Retrieved from internet on Sep. 14, 2020], <https://dl.acm.org/doi/pdf/10.1145/2756755.2756758> (Year: 2015).*
(Continued)

*Primary Examiner* — Geoffrey R St Leger
*Assistant Examiner* — Zengpu Wei
(74) *Attorney, Agent, or Firm* — Volpe Koenig

(57) ABSTRACT

The present invention provides a vehicle control device and a program update system capable of effectively suppressing erroneous execution and update of a plurality of control programs stored in a nonvolatile memory. A vehicle control device according to the present invention has a flash ROM and an operation unit. In addition, the flash ROM has a first area and a second area which store a control program executable by the operation unit and a plurality of management data areas which store management data including current program area information representing one storage
(Continued)

area of the first area and the second area as a storage area storing a current control program to be executed by the operation unit.

12 Claims, 14 Drawing Sheets

(51) Int. Cl.
*G06F 8/65* (2018.01)
*B60R 16/02* (2006.01)
*B60R 16/023* (2006.01)

(52) U.S. Cl.
CPC .. *B60R 16/0231* (2013.01); *B60W 2050/0077* (2013.01); *B60W 2050/0083* (2013.01)

(58) Field of Classification Search
USPC ........................................................ 717/169
See application file for complete search history.

(56) References Cited

U.S. PATENT DOCUMENTS

| | | | |
|---|---|---|---|
| 10,157,050 B2* | 12/2018 | Kotani | G06F 8/654 |
| 2004/0015671 A1 | 1/2004 | Takao | |
| 2005/0256614 A1 | 11/2005 | Habermas | |
| 2006/0123205 A1* | 6/2006 | Ogura | G06F 12/0246 |
| | | | 711/154 |
| 2006/0259207 A1 | 11/2006 | Natsume | |
| 2007/0005204 A1 | 1/2007 | Satoshi et al. | |
| 2013/0197712 A1* | 8/2013 | Matsuura | G06F 8/65 |
| | | | 701/1 |
| 2013/0326126 A1* | 12/2013 | Kondoh | G06F 12/0246 |
| | | | 711/103 |
| 2015/0113520 A1* | 4/2015 | Kotani | G06F 8/654 |
| | | | 717/172 |
| 2016/0202966 A1* | 7/2016 | Vangelov | H04L 67/34 |
| | | | 717/172 |
| 2016/0378457 A1* | 12/2016 | Adachi | G06F 11/00 |
| | | | 713/181 |
| 2017/0228236 A1 | 8/2017 | Fumiharu et al. | |
| 2018/0074813 A1* | 3/2018 | Granda | B60W 50/00 |
| 2018/0081671 A1* | 3/2018 | Naruse | B60R 16/0231 |
| 2018/0203685 A1* | 7/2018 | Nakamura | G06F 8/65 |

FOREIGN PATENT DOCUMENTS

| | | |
|---|---|---|
| JP | 2007-011734 A | 1/2007 |
| JP | 2013-254264 A | 12/2013 |
| JP | 2016-170740 A | 9/2016 |
| WO | 2011/047037 A1 | 4/2011 |
| WO | 2013/021423 A1 | 2/2013 |
| WO | 2016/047312 A1 | 3/2016 |
| WO | 2016/136014 A1 | 9/2016 |

OTHER PUBLICATIONS

Onuma et al, "Improved Software Updating for Automotive ECUs", [Online], 2016, pp. 319-324, [Retrieved from internet on Sep. 14, 2020], <https://ieeexplore.ieee.org/stamp/stamp.jsp?tp=&arnumber=7552226> (Year: 2016).*

Odat et al, "Firmware Over the Air for Automotive, FOTAMOTIVE", [Online], 2014, pp. 130-139, {Retrieved from internet on Sep. 14, 2020], <https://ieeexplore.ieee.org/stamp/stamp.jsp?tp=&arnumber=6871751> (Year: 2014).*

Extended European Search Report dated Sep. 22, 2020 for European Patent Application No. 18743938.5.

* cited by examiner

VEHICLE CONTROL DEVICE AND PROGRAM UPDATE SYSTEM

TECHNICAL FIELD

The present invention relates to a vehicle control device and a program update system.

BACKGROUND ART

A vehicle control device includes an operation unit (for example, a microcomputer) that executes a control program implementing an operation of controlling a vehicle and a rewritable nonvolatile memory such as a flash ROM (Read Only Memory) that stores the control program to be executed by the operation unit.

Conventionally, updating of the control program of the vehicle control device has often been carried out by a specialized maintenance person by connecting a program write device to a vehicle brought into a dealership or a maintenance factory. However, with the rapid spread of so-called "connected vehicles" in which vehicles are constantly connected to the Internet by wireless communication, similarly to adding of functions or updating of map data and the like in a car navigation system, it has been supposed that a user directly updates the control program of the vehicle via the wireless communication.

On the other hand, when writing of a new version control program fails due to some factor (communication interruption, occurrence of a failure in hardware, or the like) at the time of updating the control program of the vehicle control device, not only the new version control program but also an old version control program may be unusable or malfunction and in the worst case, the vehicle may not move.

Therefore, for example, in an automobile control unit disclosed in PTL 1, a main storage area for storing a current control program and a sub-storage area for storing a new version control program for update are provided in a flash ROM. When the control program is updated, writing is alternately performed on the respective areas. As a result, even if writing of the new version control program fails, the old version control program can be continuously used.

When the updated control program is executed, the automobile control unit accesses the respective storage areas in which programs of different versions are stored, reads and compares version information given to each control program, and executes a program identified as a new version as a current control program.

CITATION LIST

Patent Literature

PTL 1: JP 2006-301960 A

SUMMARY OF INVENTION

Technical Problem

Like the automobile control unit described above, in a configuration in which the control program of the newer version of the two control programs of the different versions stored in the storage areas is executed as the current control program, it is necessary to determine which storage area the current control program is stored in. This is also applicable when the control program is updated. Therefore, information used for determining which storage area the current control program is stored in is important.

Accordingly, an object of the present invention is to appropriately execute and update a plurality of control programs stored in a nonvolatile memory.

Solution to Problem

A vehicle control device according to an embodiment of the present invention has a rewritable nonvolatile memory and an operation unit. The nonvolatile memory has a first storage area and a second storage area which store a control program executable by the operation unit and a plurality of management data storage areas which store management data including current program area information representing whether a storage area storing a current control program to be executed by the operation unit is the first storage area or the second storage area.

DESCRIPTION OF EMBODIMENTS

Hereinafter, a program update system according to an embodiment of the present invention will be described with reference to the respective drawings.

Figure 1:
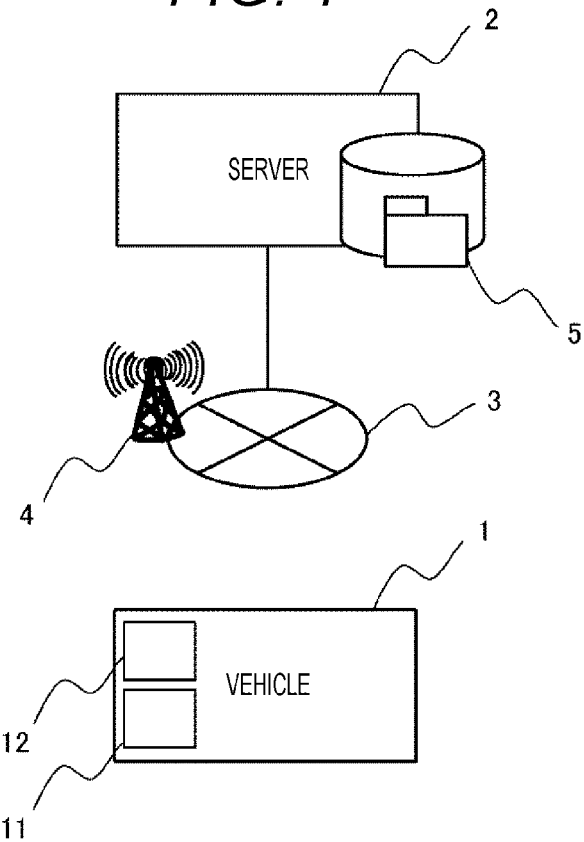
FIG. 1 is a configuration diagram of a program update system including a vehicle control device according to an embodiment of the present invention.

FIG. 1 is a configuration diagram of the program update system according to the embodiment of the present invention. The program update system includes a vehicle 1, a server 2, an Internet line 3, and a wireless base station 4. The vehicle 1 is connected to the server 2 by wireless communication via the Internet line 3 and the wireless base station 4 and they communicate with each other. The wireless communication is realized by using a mobile phone network using a public line such as 3G/LTE or a line such as WiFi, for example. The server distributes an update package 5 necessary for updating a control program of a vehicle control device 11 of the vehicle 1 to the vehicle 1. The vehicle control device 11 of the vehicle 1 updates the control program using the update package 5.

Figure 2:
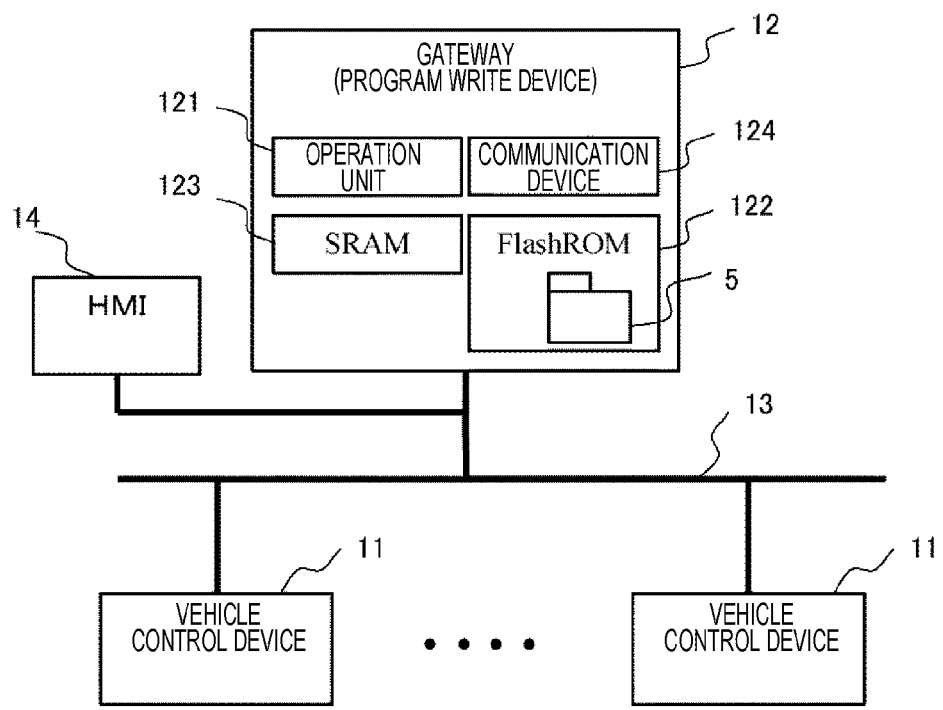
FIG. 2 is a configuration diagram of an in-vehicle network system of a vehicle.

FIG. 2 is a configuration diagram of an in-vehicle network system mounted on the vehicle 1. The vehicle control device 11 is a device executing the control program for controlling an operation of the vehicle 1 and is connected to a gateway 12 via an in-vehicle network 13 (for example, a car area network (CAN)). The vehicle control device 11 can communicate with other vehicle control devices 11 via the gateway 12.

Further, the gateway 12 has a function as a program write device that controls updating of the control program of the vehicle control device 11. The gateway 12 receives the update package 5 from the server 2 and transmits a control program update command (reprogramming command) and a control program for update to the vehicle control device 11. The program write device may be provided separately from the gateway 12.

The gateway 12 has an operation unit 121, a flash ROM (Read Only Memory) 122, a static random access memory (SRAM) 123, and a communication device 124 including a CAN transceiver and a wireless communication module. The operation unit 121 executes a program stored in the flash ROM 122 and communicates with the vehicle control device 11 and the server 2 on the in-vehicle network 13. Further, at the time of updating the control program of the vehicle control device 11, the gateway 12 receives the update package 5 from the server 2, temporarily stores the update package 5 in the flash ROM 122, and updates the control program of the vehicle control device 11 using the temporarily stored update package 5.

Further, a human-machine interface (HMI) 14 includes a liquid crystal display device for various displays embedded in a center of a dashboard of the vehicle 1, operation switches arranged in the vicinity of the liquid crystal display device, and an in-vehicle speaker, for example. The HMI 14 performs various displays with respect to occupants of the vehicle 1 and processes various input operations. Further, displays and operation inputs relating to updating of the control program of the vehicle control device 11 are performed in the HMI 14.

Figure 3:
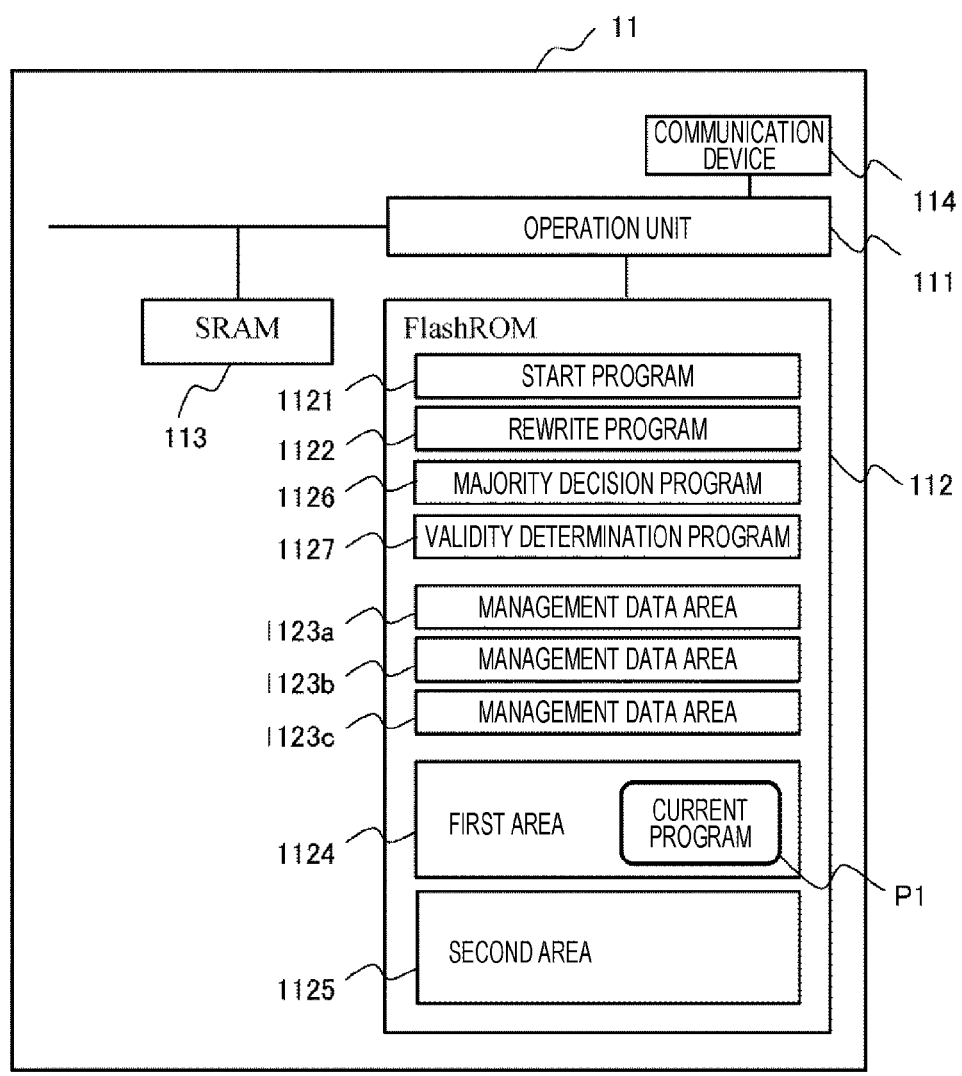
FIG. 3 is a functional block diagram of a vehicle control device.

FIG. 3 is a functional block diagram of the vehicle control device 11. The vehicle control device 11 includes an operation unit 111, a flash ROM 112, a SRAM 113, and a communication device 114 (for example, a CAN transceiver).

The operation unit 111 is an operation device such as a microcomputer that executes a control program stored in the flash ROM 112. Hereinafter, for the convenience of description, each program may be described as an operation subject. However, in actuality, the operation unit 111 executes the program.

The flash ROM 112 is a rewritable nonvolatile memory and stores a start program 1121, a rewrite program 1122, a majority decision program 1126, and a validity determination program 1127. Further, the flash ROM 112 has a first area 1124 as a first storage area, a second area 1125 as a second storage area, and a plurality of management data areas 1123a, 1123b, and 1123c as a plurality of management data storage areas.

The first area 1124 is a storage area for storing a control program that can be executed by the operation unit 111. The second area 1125 is a storage area for storing a control program that can be executed by the operation unit 111 and has a version different from a version of the control program stored in the first area 1124. The plurality of management data areas 1123a, 1123b, and 1123c are storage areas for storing management data including current program area information that represents one storage area of the first area 1124 and the second area 1125 as a storage area storing a current control program to be executed by the operation unit 111.

The start program 1121 is a program that is first executed by the operation unit 111 when the vehicle control device 11 starts in a normal mode.

The rewrite program 1122 is a program that is executed by the operation unit 111 when the vehicle control device 11 transits to a reprogramming mode. When the operation unit 111 executes the rewrite program 1122, according to a request from the gateway 12, the operation unit 111 leaves the current control program stored in one area of the first area 1124 and the second area 1125 as it is and rewrites an old version control program not to be the current control program or null data, which is stored in the other area, with a new version control program for update (hereinafter, simply referred to as "new control program"). In the present embodiment, as an example, it is assumed that the current control program P1 is stored in the first area 1124 and the old version control program or the null data is stored in the second area 1125, in a state before update.

The majority decision program 1126 and the validity determination program 1127 will be described later.

Figure 4:
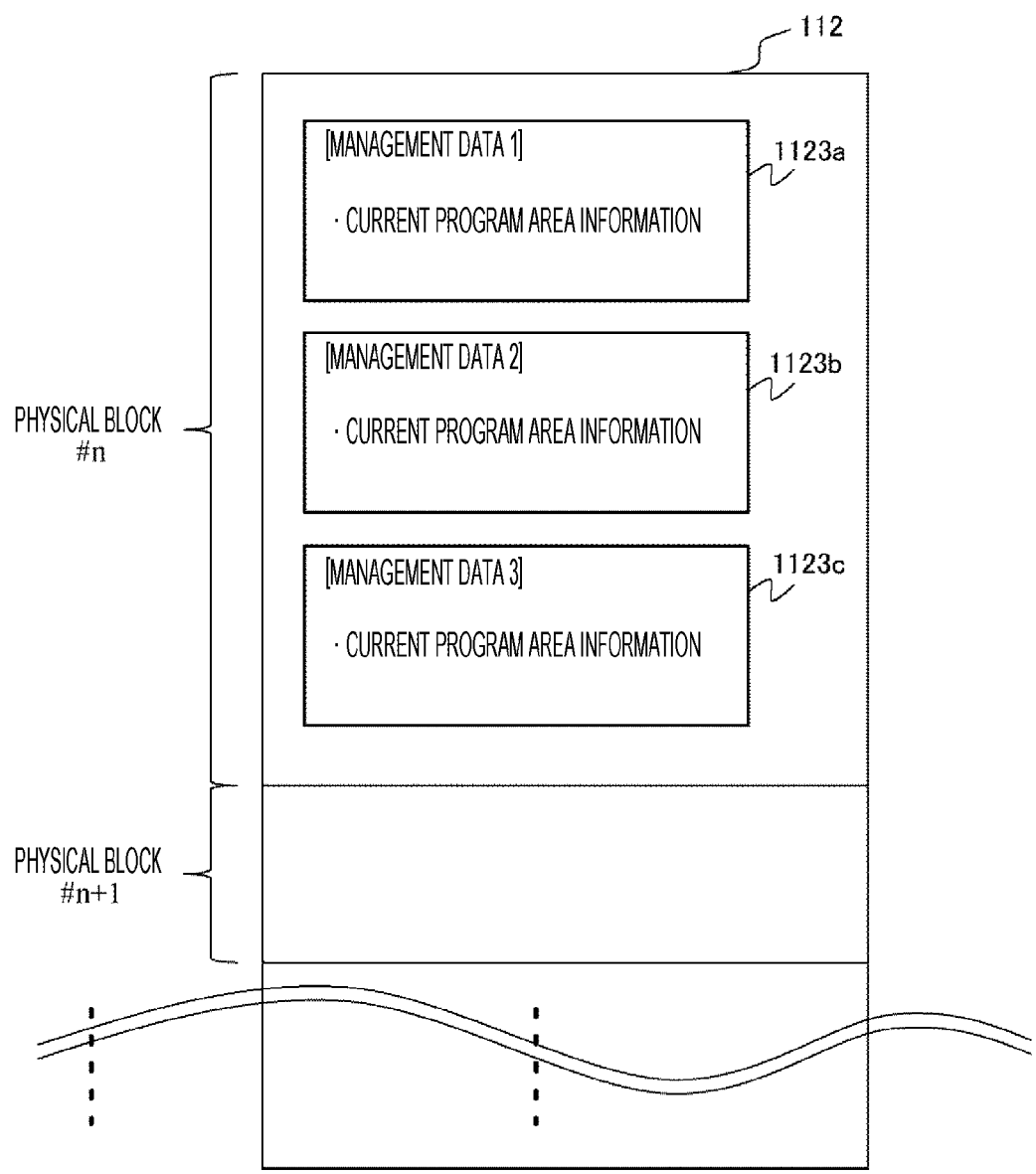
FIG. 4 is a diagram showing an arrangement example of management data areas.

FIG. 4 is a diagram showing an arrangement example of the management data areas 1123a, 1123b, and 1123c. The management data areas 1123a, 1123b, and 1123c are collectively arranged in one of physical blocks that are erase and write unit blocks of the flash ROM 112. The management data areas 1123a, 1123b, and 1123c are configured to store management data 1, 2, and 3 of the same content, respectively. In the present embodiment, the management data areas 1123a, 1123b, and 1123c store the management data 1, 2, and 3 of the same content, respectively. Each of the management data 1, 2, and 3 includes current program area information.

The current program area information is a flag representing which of the first area 1124 and the second area 1125 stores the current control program.

Figure 5:
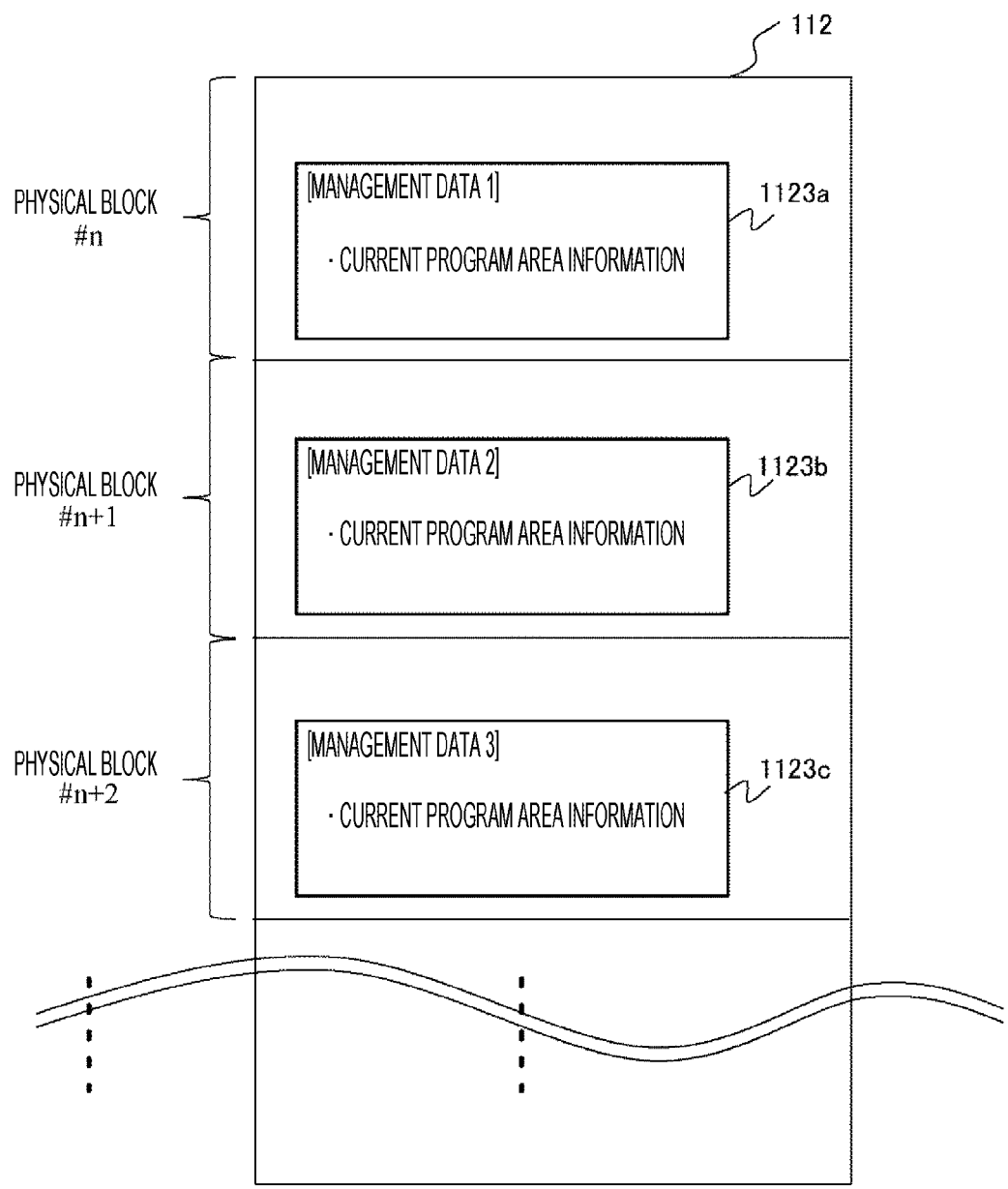
FIG. 5 is a diagram showing another arrangement example of management data areas.

FIG. 5 is a diagram showing another arrangement example of the management data areas 1123a, 1123b, and 1123c. The management data areas 1123a, 1123b, and 1123c are arranged to be distributed one by one in different physical blocks of the flash ROM 112. In this way, it is possible to reduce the possibility of losing all management data due to a write error or the like in a specific physical block.

Figure 6:
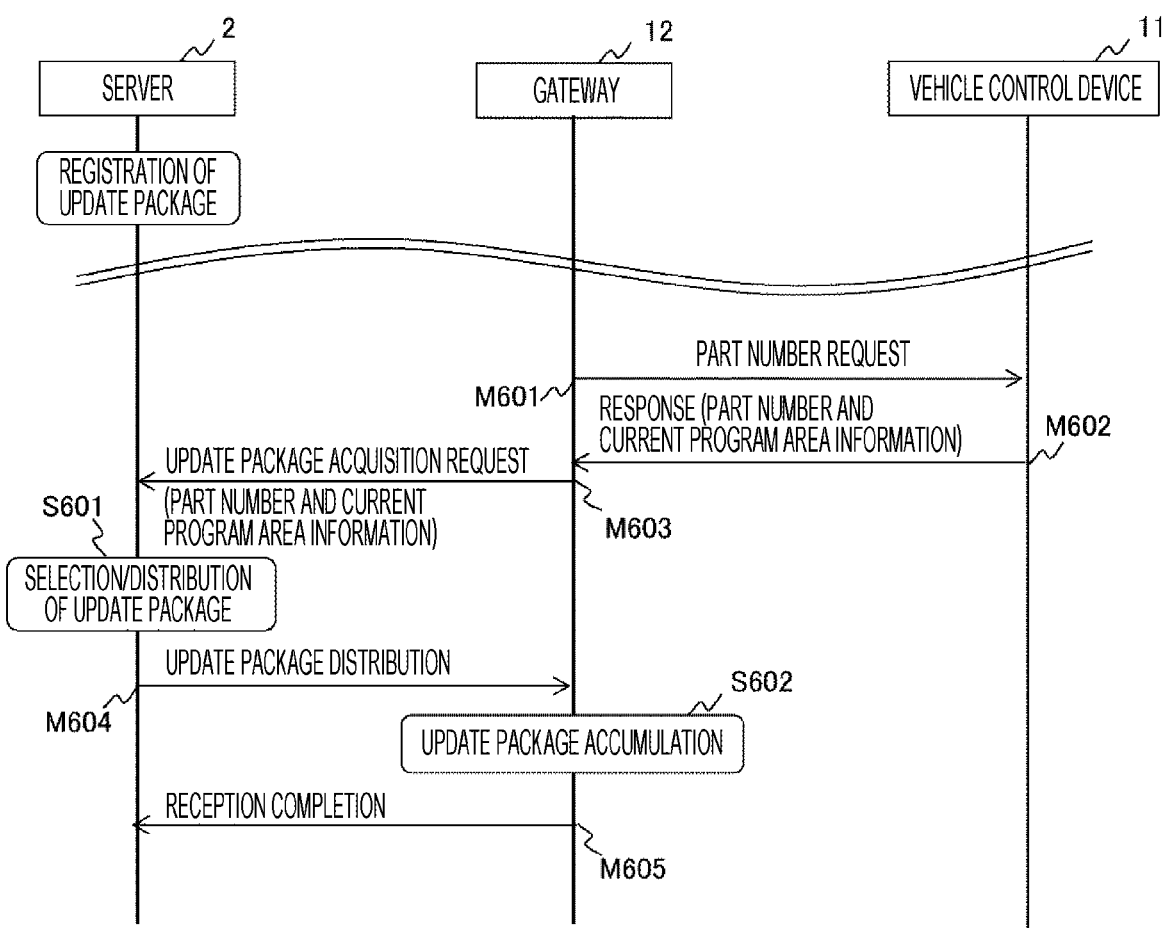
FIG. 6 is a sequence diagram showing an example of processing for downloading an update package to a vehicle.

FIG. 6 is a sequence diagram showing an example of processing for downloading the update package 5 from the server 2 to the gateway 12.

When the control program of the vehicle control device 11 is corrected, the update package 5 is registered in the server 2 as preparation for updating the control program. In addition, at timing when the ignition of the vehicle 1 starts, the gateway 12 transmits a part number request message M601 for requesting a part number of the current control program to the vehicle control device 11. When the vehicle control device 11 receives the part number request message M601, the vehicle control device 11 transmits a response message M602 including the part number of the current control program and the current program area information. The part number is a number (identification number) for identifying the control program and is uniquely assigned to each control program of each version, and the current control program, the new control program for update, and the old version control program have different part numbers, respectively.

Next, the gateway 12 transmits an update package acquisition request message M603 to the server 2. The update package acquisition request message M603 includes the part number of the current control program of the vehicle control device 11 and the current program area information acquired from the response message M602. When the server 2 receives the update package acquisition request message M603, the server 2 selects the corresponding update package 5 from the registered update packages, on the basis of the part number and the current program area information included in the update package acquisition request message M603, and transmits an update package distribution message M604 including the update package 5 to the target vehicle 1 that has transmitted the update package acquisition request message M603 (update package selection/distribution processing S601).

By transmitting the part number of the current control program and the current program area information to the server 2, the appropriate update package 5 can be selected in the server 2. When there is no corresponding update package 5, the server 2 transmits a message showing that there is no corresponding update package 5 to the gateway 12 and the gateway 12 and the vehicle control device 11 start normally without performing update processing.

The gateway 12 accumulates the distributed update package 5 in the flash ROM 122. When all data of the update package 5 is completely accumulated, the gateway 12 transmits a reception completion message M605 to the server 2 (update package accumulation processing S602). Then, the gateway 12 executes updating of the control program of the vehicle control device 11, on the basis of the received update package 5.

Figure 7:
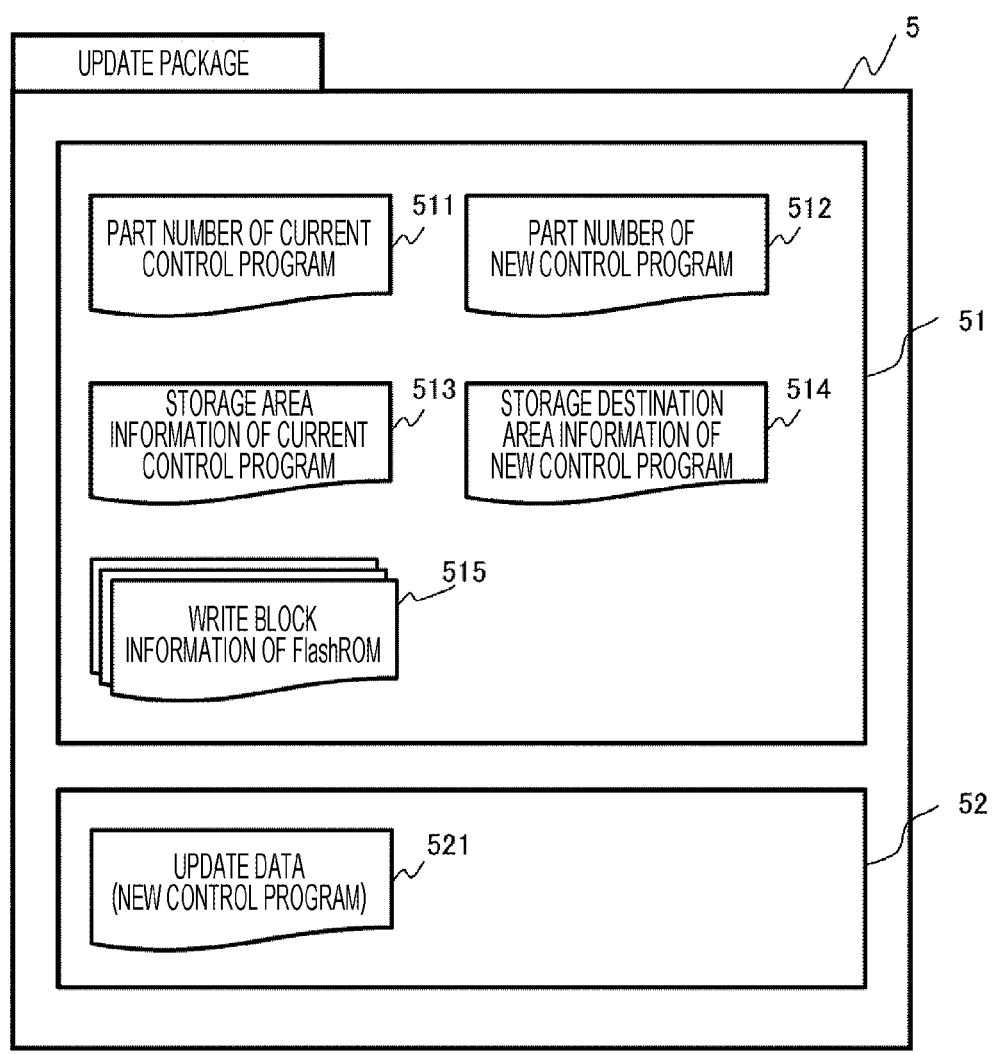
FIG. 7 is a diagram showing a configuration example of an update package.

FIG. 7 is a configuration example of the update package 5 acquired from the server 2 by the gateway 12.

The update package 5 includes update control information 51 and update data 52.

The update control information 51 includes a part number 511 of the current control program, a part number 512 of the new control program, storage area information 513 of the current control program, storage destination area information 514 of the new control program, and write block information 515 of a plurality of flash ROMs.

The storage area information 513 of the current control program is information representing which of the first area 1124 and the second area 1125 the current control program of the vehicle control device 11 is stored. The storage destination area information 514 of the new control program is information showing an area to which the new control program is to be written by the present update. In the present embodiment, in a state before the update, the "first area 1124" is stored in the storage area information 513 of the current control program and the "second area 1125" is stored in the storage destination area information 514 of the new control program. The write block information 515 of the flash ROM is information showing a head address and a capacity (number of bytes) of each physical block of the flash ROM. By including the part number 511 of the current control program and the storage area information 513 of the current control program in the update package 5, it is possible to check consistency of the requested data and the received data by associating these pieces of information in the gateway 12. Further, by including the part number 512 of the new control program and the storage destination area information 514 of the new control program in the update package 5, it can be used for the consistency check at the time of next update.

The update data 52 includes update data 521 that is new control program for update. The update data 52 is not limited to the new control program. For example, the update data 52 may be data obtained by compressing the new control program or differential data between the current control program and the new control program.

Figure 8:
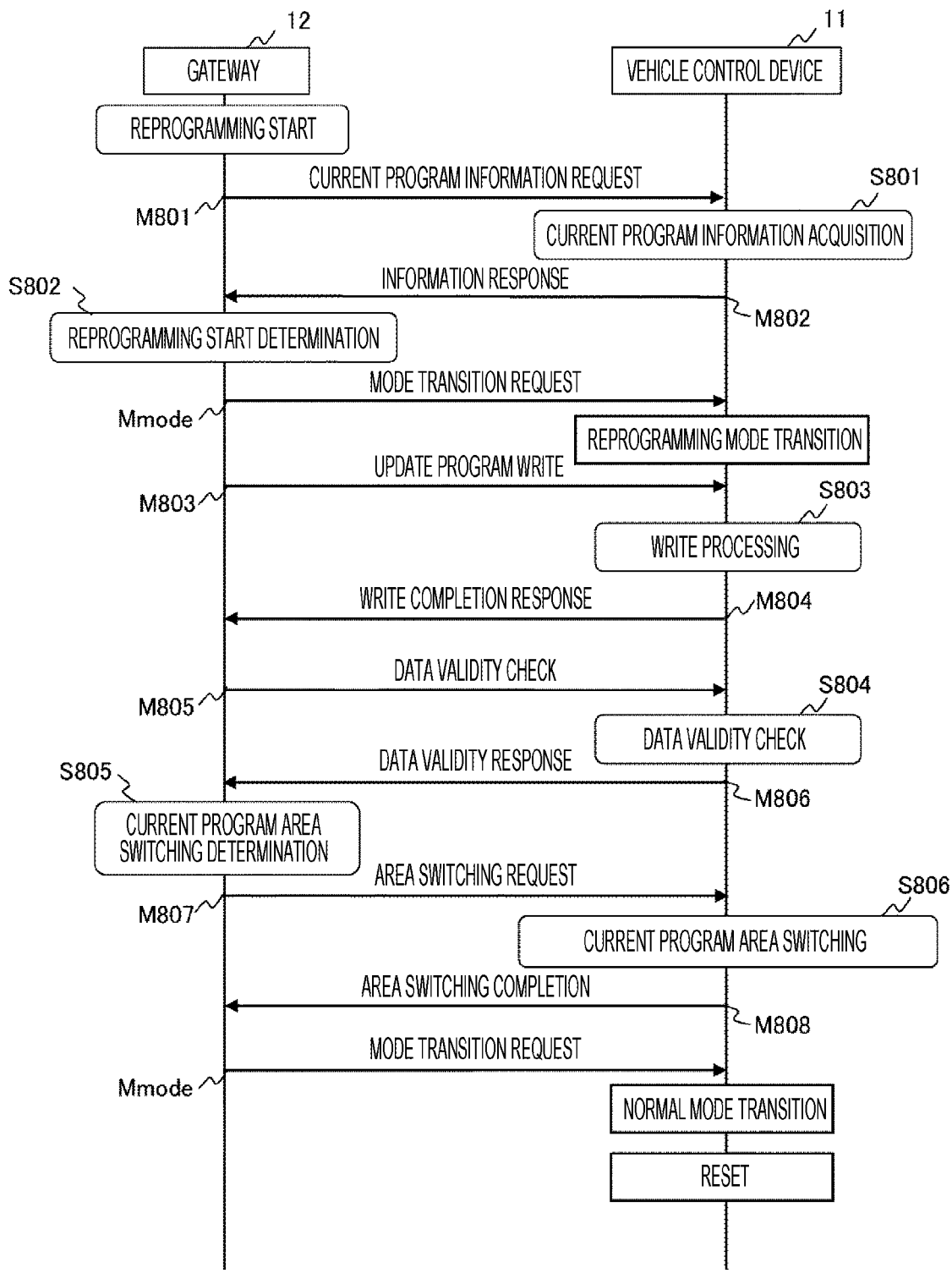
FIG. 8 is a sequence diagram showing an example of processing for updating a control program by a vehicle control device.

FIG. 8 is a sequence diagram showing an example of processing for updating a control program by the vehicle control device 11. An update sequence in the present embodiment will be described below according to FIG. 8.

When the gateway 12 starts updating of the control program (reprogramming start), the gateway 12 first transmits a current program information request message M801 to the vehicle control device 11 to request information on the current control program. When the vehicle control device 11 receives the current program information request message M801, the vehicle control device 11 acquires the information on the current control program, includes a result in an information response message M802, and transmits the information response message M802 to the gateway (current program information acquisition processing S801). Here, the information on the current control program to be acquired is the part number of the current control program and the current program area information. The current program area information is stored in the plurality of management data areas 1123a, 1123b, and 1123c. The current program information acquisition processing S801 for acquiring the current program area information will be described later.

The gateway 12 compares the part number of the current control program and the current program area information included in the received information response message M802 with the part number of the current control program and the current program area information held by the gateway 12 and determines the update start of the control program (reprogramming start determination processing S802). The reprogramming start determination processing S802 will be described later. When a comparison result is matching, the gateway 12 transmits a mode transition request message Mmode to the vehicle control device 11 and causes the vehicle control device 11 to transit from a normal mode to a reprogramming mode. When the mode transits to the reprogramming mode, the operation unit 111 of the vehicle control device 11 executes the rewrite program 1122. Thereby, the vehicle control device 11 and the gateway 12 start program update processing. When the comparison result is mismatching, the program update processing does not start.

In the program update processing, the gateway 12 transmits an update program write message M803 to the vehicle control device 11 so as to write a new control program for update to the write destination area. The update program write message M803 includes the update data 521 (new control program for update) of the update package 5 and the storage destination area information 514 of the new control program. When the vehicle control device 11 in the reprogramming mode receives the update program write message M803 from the gateway 12, the vehicle control device 11 writes the update data 521 to the area shown in the storage destination area information 514 of the new control program in the first area 1124 and the second area 1125 (write processing S803). At the time of the write, the vehicle control device 11 may write the update data 521 after confirming that the area shown in the current program area information acquired from the management data areas 1123a, 1123b, and 1123c and the area shown in the storage destination area information 514 of the new control program are different from each other (that is, the new control program is written to an area different from the area storing the current control program). The vehicle control device 11 transmits a write completion response message M804 to the gateway 12 when the update data 521 is completely written.

The gateway 12 transmits a data validity check message M805 to the vehicle control device 11 so as to check the validity of the written data. When the vehicle control device 11 receives the data validity check message M805, the vehicle control device 11 checks the validity of the written new control program for update (data validity check processing S804). In the data validity check, it is verified whether there is no error in the written data of the new control program (whether the update data has been correctly written). Specifically, this is performed by an error detection unit using a checksum, a cyclic redundancy check (CRC), or a hash value. When the validity of the data is confirmed, the vehicle control device 11 transmits a data validity response message M806 to the gateway 12.

When the validity of the data is confirmed, the gateway 12 determines whether or not switching from one area of the first area 1124 and the second area 1125 as the area where the current control program is stored to the other area is enabled (current program area switching determination processing S805). The current program area switching determination processing S805 will be described later. When it is determined that the switching is enabled, a current program area switching request message M807 is transmitted to the vehicle control device 11. When the vehicle control device 11 receives the current program area switching request message M807, the vehicle control device performs switching of the area where the current control program is stored (current program area switching processing S806). The current program area switching processing S806 will be described later.

When the gateway 12 receives an area switching completion response message M808 from the vehicle control device 11, the gateway 12 transmits a mode transition request message Mmode to the vehicle control device 11, causes the vehicle control device 11 to transit from the reprogramming mode to the normal mode, and resets the vehicle control device 11. The resetting causes the vehicle control device 11 to restart in the normal mode, and the operation unit 111 executes the start program 1121 and executes a newly written new control program as the current control program.

Figure 9:
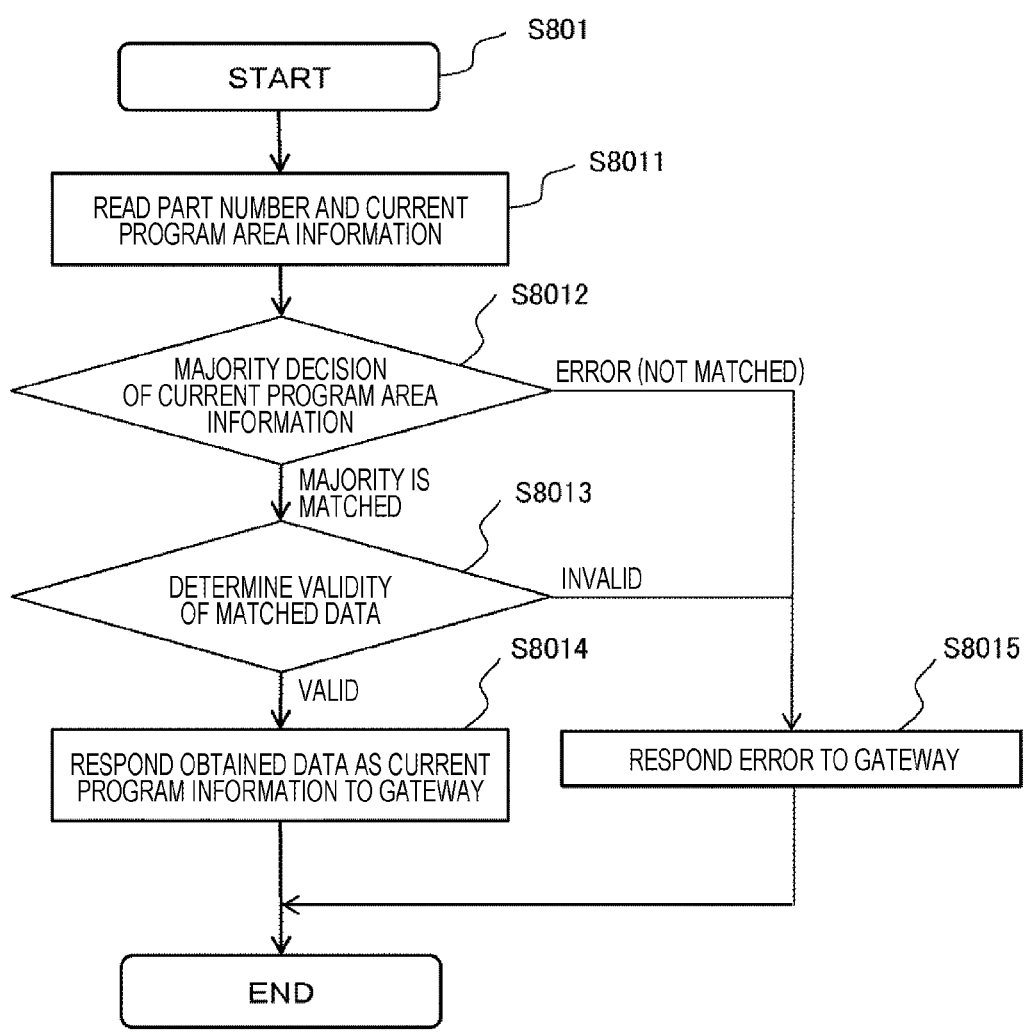
FIG. 9 is a flowchart showing an example of processing for acquiring current program area information, which is executed by a vehicle control device.

FIG. 9 is a flowchart showing an example of the current program information acquisition processing S801. Each step of FIG. 9 will be described below.

When the operation unit 111 of the vehicle control device 11 receives the current program information request message M801 from the gateway 12, the operation unit 111 starts the processing shown in the present flowchart.

The operation unit 111 reads the part number of the current control program and the plurality of pieces of current program area information stored in the management data areas 1123a, 1123b, and 1123c (S8011).

Next, the operation unit 111 performs a majority decision of the current program area information. When the majority of all the current program area information is matched, the operation unit 111 determines a value shown in the matched current program area information as correct information (majority decision processing S8012 of which the details will be described later). When the majority of the current program area information is matched, the operation unit 111 subsequently determines the validity of data obtained as a result of the majority decision (validity determination processing S8013 of which the details will be described later).

When a result of the validity determination is "valid", the information response message M802 including the part number of the current control program shown in the current program area information and the current program area information is transmitted (returned) to the gateway 12 (S8014). By transmitting the part number of the current control program shown in the current program area information and the current program area information to the gateway 12, in the gateway 12, a new control program for update can be acquired from the server using these pieces of information and the acquired new control program can be checked.

When the majority of the current program area information is not matched or the result of the validity determination is "invalid", the information response message M802 including the error information is transmitted (returned) to the gateway 12 (S8015).

Figure 10:
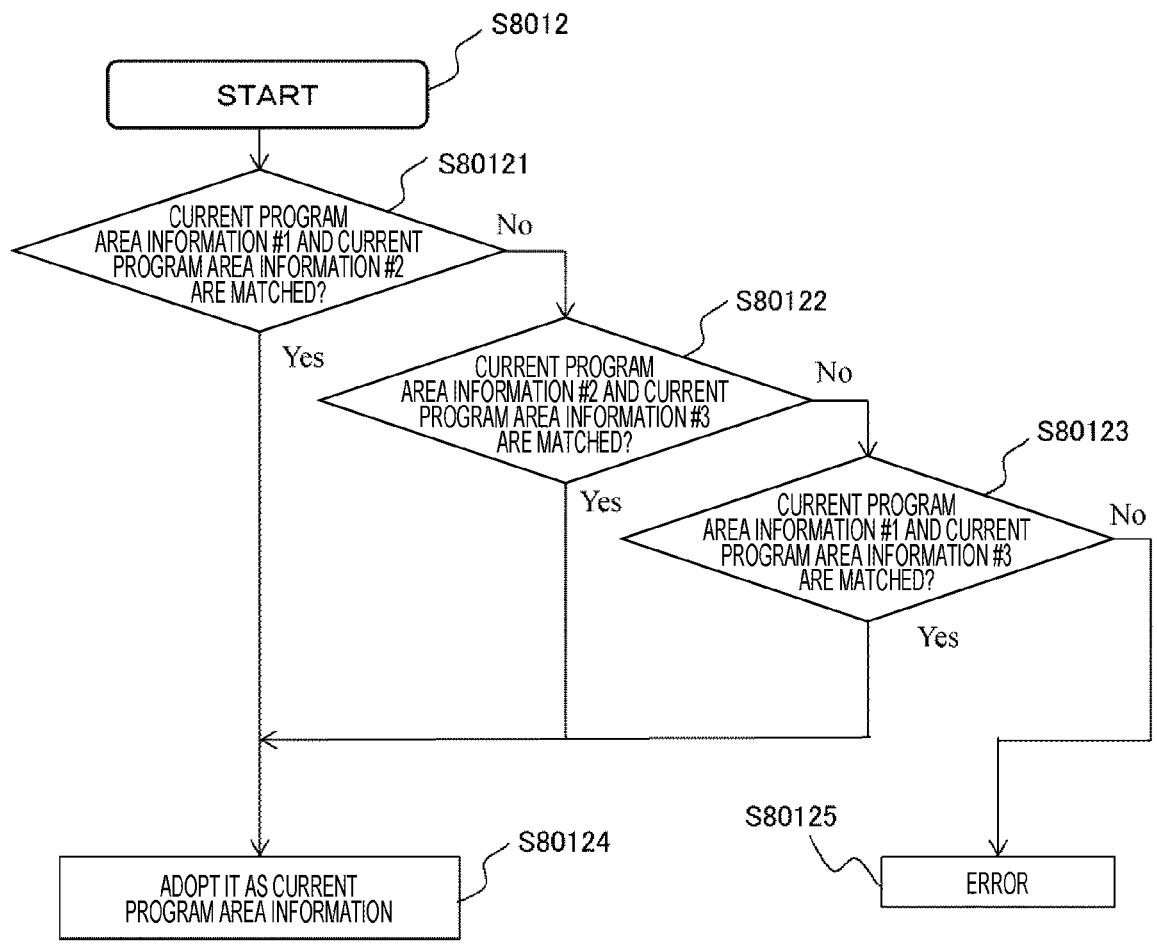
FIG. 10 is a flowchart showing an example of majority decision processing.

FIG. 10 is a flowchart showing an example of the majority decision processing S8012. Each step of FIG. 10 will be described below.

The operation unit 111 executes the majority decision program 1126 and starts the processing shown in the present flowchart.

First, it is determined whether the current program area information ("current program area information #1" in FIG. 10) of the management data area 1123a and the current program area information ("current program area information #2" in FIG. 10) of the management data area 1123b are matched (S80121). When the pieces of information are matched, data thereof is adopted as correct current program area information and "majority is matched" is returned (S80124). When the pieces of information are not matched, next, it is determined whether the current program area information of the management data area 1123b and the current program area information ("current program area information #3" in FIG. 10) of the management data area 1123c are matched (S80122). When the pieces of information are matched, data thereof is adopted as correct current program area information and "majority is matched" is returned (S80124). When the pieces of information are not matched, next, it is determined whether the "current program area information #1" and the "current program area information #3" are matched (S80123). When the pieces of information are matched, data thereof is adopted as correct current program area information and "majority is matched" is returned (S80124).

When at least two of the "current program area information #1", the "current program area information #2", and the "current program area information #3" are not matched, it is regarded that there is no data to be matched and "error (mismatching)" is returned (S80125).

As such, when matching of at least the majority of the plurality of pieces of current program area information is found, the information is adopted as the correct current program area information. As a result, even if abnormality (data corruption) occurs in one of the pieces of current program area information, it is possible to continuously execute an operation using other current program area information which is presumed to be correct.

In the present embodiment, the configuration having the three management data areas 1123a, 1123b, and 1123c has been described as an example. However, the number of management data areas is not necessarily three and may be three or more. Further, the number of management data areas is preferably an odd number. However, the number of management data areas may be an even number. In the case where the number of management data areas is an even number, for example, when matching of most information in the plurality of pieces of current program area information is found, the information may be adopted as the correct current program area information. Even in this configuration, the same function and effect as the majority are obtained.

Figure 11:
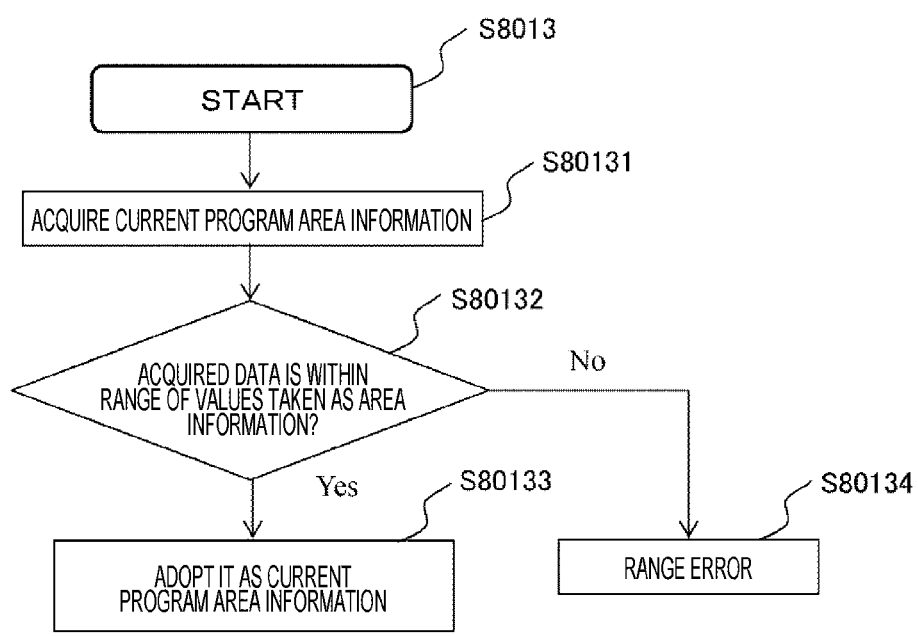
FIG. 11 is a flowchart showing an example of validity determination processing.

FIG. 11 is a flowchart showing an example of the validity determination processing S8013. Each step of FIG. 11 will be described below.

The operation unit 111 executes the validity determination program 1127 and starts the processing shown in the present flowchart.

The current program area information adopted in the majority decision processing S8012 described above is acquired (S80131). Next, it is determined whether or not the acquired current program area information is a valid value (value included in a range of values that can be taken as the current program area information) as information representing the storage area of the current control program (S80132). In the present embodiment, it becomes a value showing any one of the first area 1124 and the second area 1125. In the case of the valid value, it is adopted as the correct current program area information and "valid" is returned (S80133).

On the other hand, when the acquired data is not within the valid data range, "invalid" is returned as a range error (S80134). In the present embodiment, it shows the case where the value is not the value showing the first area 1124 or the second area 1125.

As such, in addition to the majority decision processing S8012, for the current program area information, the validity of the information is checked, so that it is possible to prevent processing based on abnormal information in advance.

Figure 12:
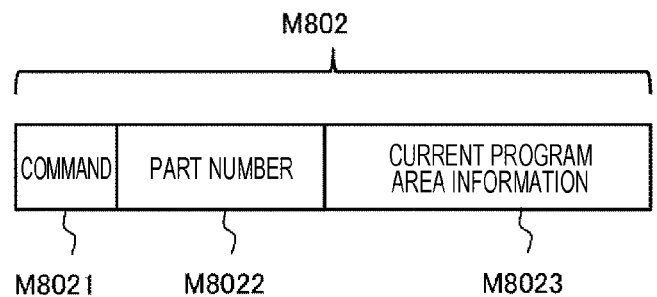
FIG. 12 is a configuration example of a response message to transmit current program area information to a gateway by a vehicle control device.

FIG. 12 is a configuration example of the information response message M802 transmitted from the vehicle control device 11 to the gateway 12. The information response message M802 has a command M8021, a part number M8022, and current program area information M8023.

In the command M8021, information showing that the present message is a response to the current program information request message M801 is stored. In the part number M8022, a part number of the current control program of the vehicle control device 11 is stored. In the current program area information M8023, information representing an area where the current control program of the vehicle control device 11 is stored is stored.

In the part number M8022 and the current program area information M8023, the information acquired by the current program information acquisition processing S801 described above is stored.

Figure 13:
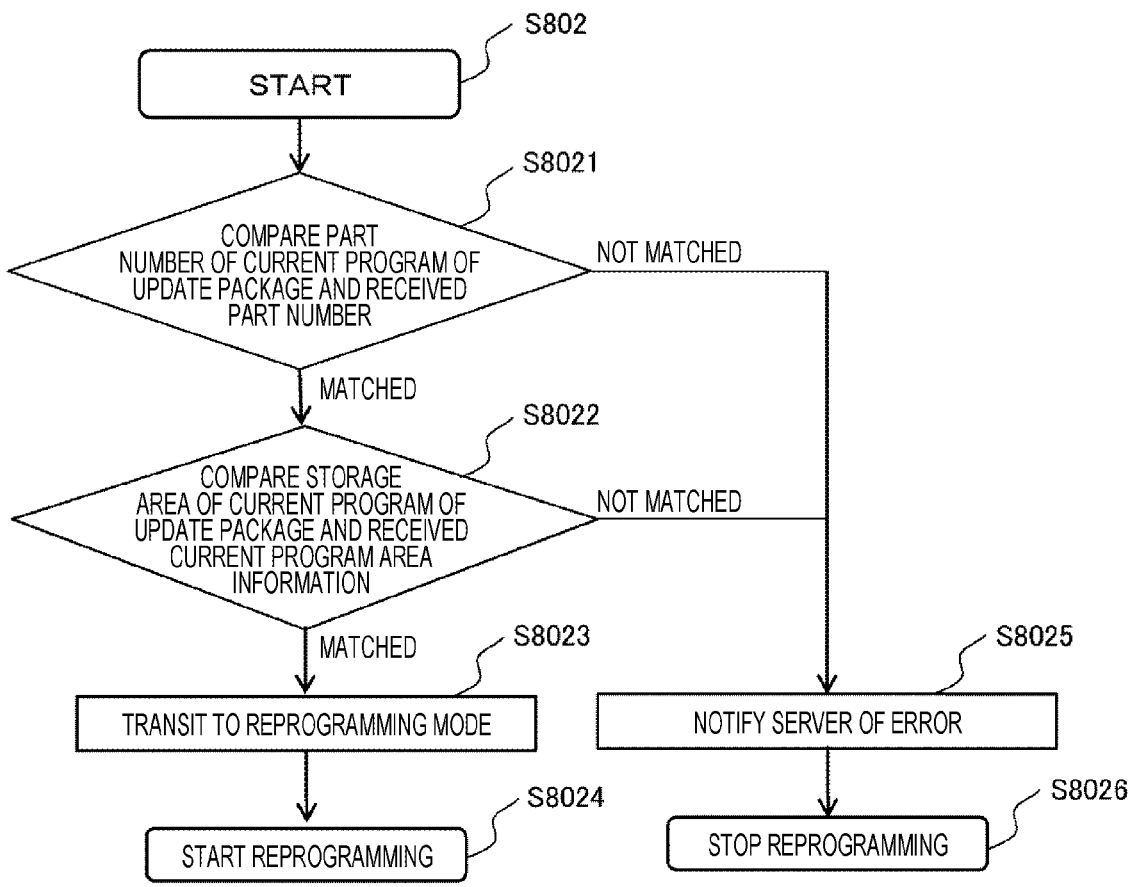
FIG. 13 is a flowchart showing an example of processing for determining whether reprogramming starts, which is executed by a gateway.

FIG. 13 is a flowchart showing an example of the reprogramming start determination processing S802 executed in the gateway 12. Each step of FIG. 13 will be described below.

When the gateway 12 (specifically, the operation unit 121) receives the information response message M802, the gateway 12 starts the processing shown in the present flowchart.

The gateway 12 compares the part number 511 of the current control program included in the update package 5 received from the server 2 and accumulated in the flash ROM 122 with the part number M8022 included in the information response message M802 received from the vehicle control device 11 (S8021). When the part numbers are matched, the gateway 12 compares the storage area information 513 of the current control program included in the update package 5 with the current program area information M8023 included in the information response message M802 received from the vehicle control device 11.

When these are matched, the gateway 12 transmits the mode transition request message Mmode to be a command of the transition to the reprogramming mode to the vehicle control device 11 (S8023), causes the vehicle control device 11 to transit from the normal mode to the reprogramming mode, and starts the update processing of the program (S8024).

In the comparison processing of steps S8021 and S8022, in the case of mismatching, the gateway 12 transmits an error notification message to the server (S8025) and stops (does not start) the program update processing (S8026).

As such, by checking the current program area information of the vehicle control device 11 in the gateway 12 before starting the reprogramming mode, abnormality can be detected and erroneous program update can be prevented in advance at the side of the gateway 12.

Figure 14:
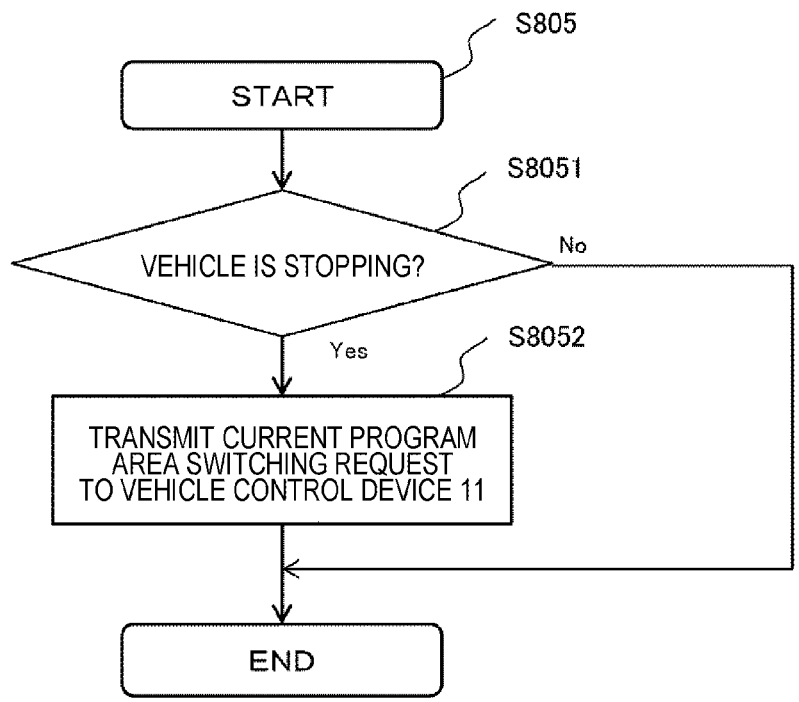
FIG. 14 is a flowchart showing an example of processing for requesting a vehicle control device to perform program area switching, which is executed by a gateway.

FIG. 14 is a flowchart showing an example of the current program area switching determination processing S805 executed in the gateway 12. Each step of FIG. 14 will be described below.

After writing (write processing S803) of the new control program to the second area 1125 where the current control program of the vehicle control device 11 is not stored is completed and the data validity check processing S804 for checking the validity of the written data is completed, the gateway 12 executes the processing shown in the present flowchart so as to switch the control program executed by the operation unit 111 of the vehicle control device 11 from the current control program to the written new control program.

The gateway 12 determines whether or not the vehicle is stopping (S8051). When the vehicle is stopping, the gateway 12 transmits the current program area switching request message M807 to the vehicle control device 11 (S8052). On the other hand, when the vehicle is not stopping, the current program area switching request message is not transmitted. When the vehicle is not stopping, a driver may be urged to stop the vehicle by screen display or voice guidance through the HMI 14. In this way, it is possible to prevent switching of the control program during traveling and it is possible to avoid an abnormal operation of the vehicle due to switching of the control program during traveling.

Figure 15:
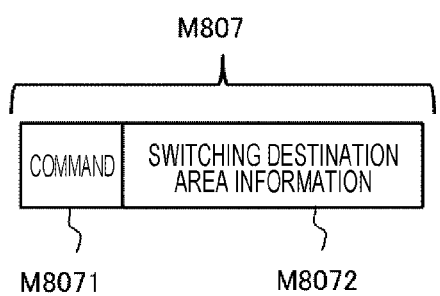
FIG. 15 is a command example of a program area switching request.

FIG. 15 is a configuration example of the current program area switching request message M807 transmitted from the gateway 12 to the vehicle control device 11. As shown in FIG. 15, it has a command M8071 and switching destination area information M8072.

The command M8071 shows that the present message is the current program area switching request message M807. The switching destination area information M8072 is information representing an area to which the new control program has been written. In the present embodiment, the "second area" is stored as an example.

Figure 16:
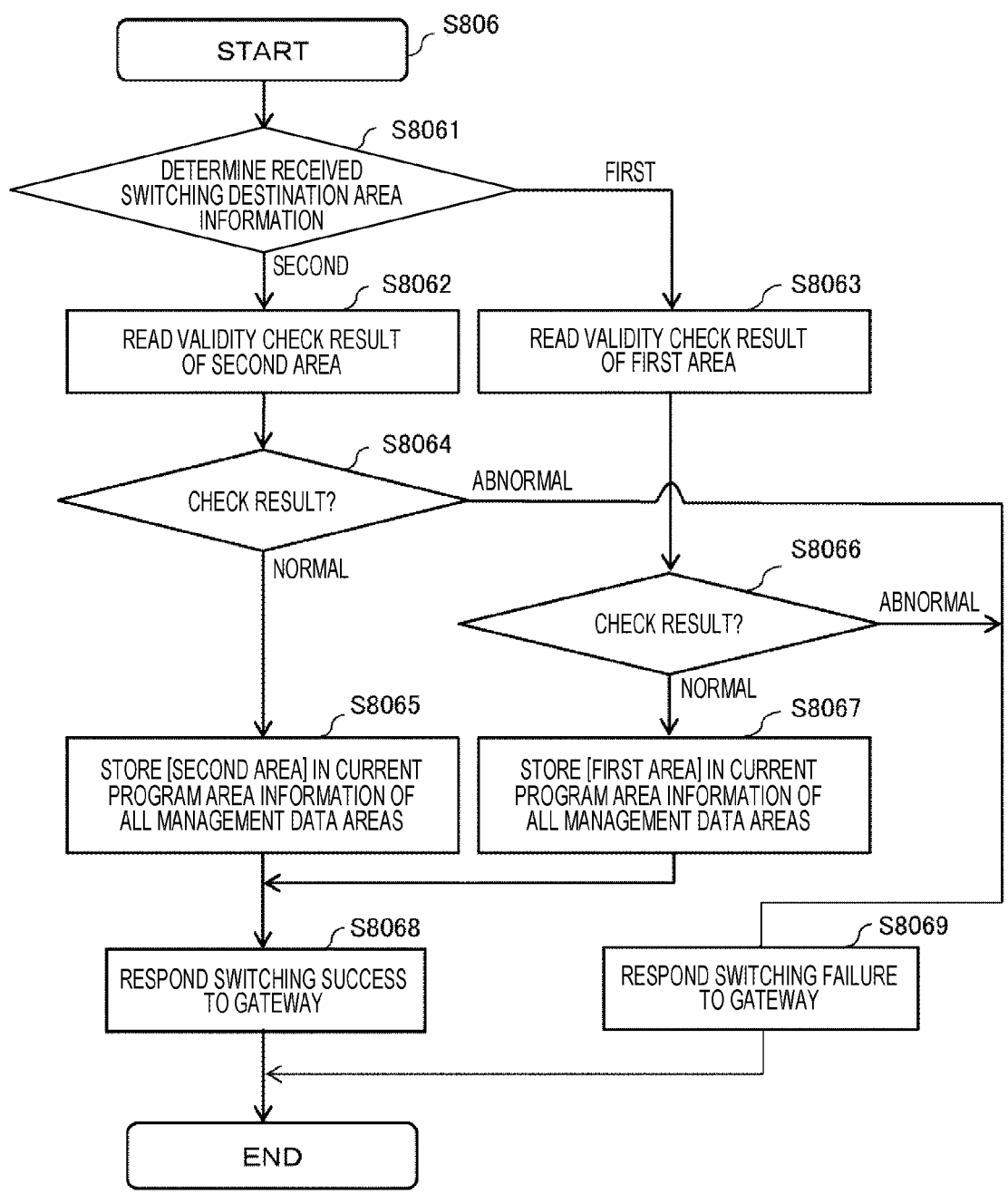
FIG. 16 is a flowchart showing an example of processing for performing program area switching by a vehicle control device.

FIG. 16 is a flowchart showing an example of the current program area switching processing S806. Each step of FIG. 16 will be described below.

When the operation unit 111 of the vehicle control device 11 receives the current program area switching request message M807 from the gateway 12, the operation unit 111 starts the processing shown in the present flowchart.

The operation unit 111 determines whether the switching destination is the first area 1124 or the second area 1125, on the basis of the switching destination area information M8072 of the received current program area switching request message M807 (S8061). When the switching destination area is the "second area", the validity check result of the data of the second area 1125 is read (S8062) and the read validity check result is determined (S8064). When the result is normal, the "second area" is stored in the current program area information of all the management data areas 1123a, 1123b, and 1123c (S8065). Or, when the switching destination area is the "first area", the validity check result of the data of the first area 1124 is read (S8063) and the read validity check result is determined (S8066). When the result is normal, the "first area" is stored in the current program area information of all the management data areas 1123a, 1123b, and 1123c (S8067).

When updating of all the management data areas 1123a to 1123c is completed, the operation unit 111 transmits the area switching completion response message M808 to the gateway 12 (S8068). On the other hand, when the validity check result in step S8064 or step S8066 is abnormal, updating of the management data areas 1123a, 1123b, and 1123c is not performed and an area switching failure response message is transmitted to the gateway (S8069).

When the write processing S803 of the new control program is abnormal (when the data validity check becomes abnormal), updating of all the management data areas 1123a, 1123b, and 1123c is not performed and a control area where the current control program is stored is represented. Therefore, at next starting, the new control program that has not normally written is not executed and the current control program is executed in the same manner as the previous. As a result, execution of the new control program that has not normally written can be avoided and the current control program can be executed.

Figure 17:
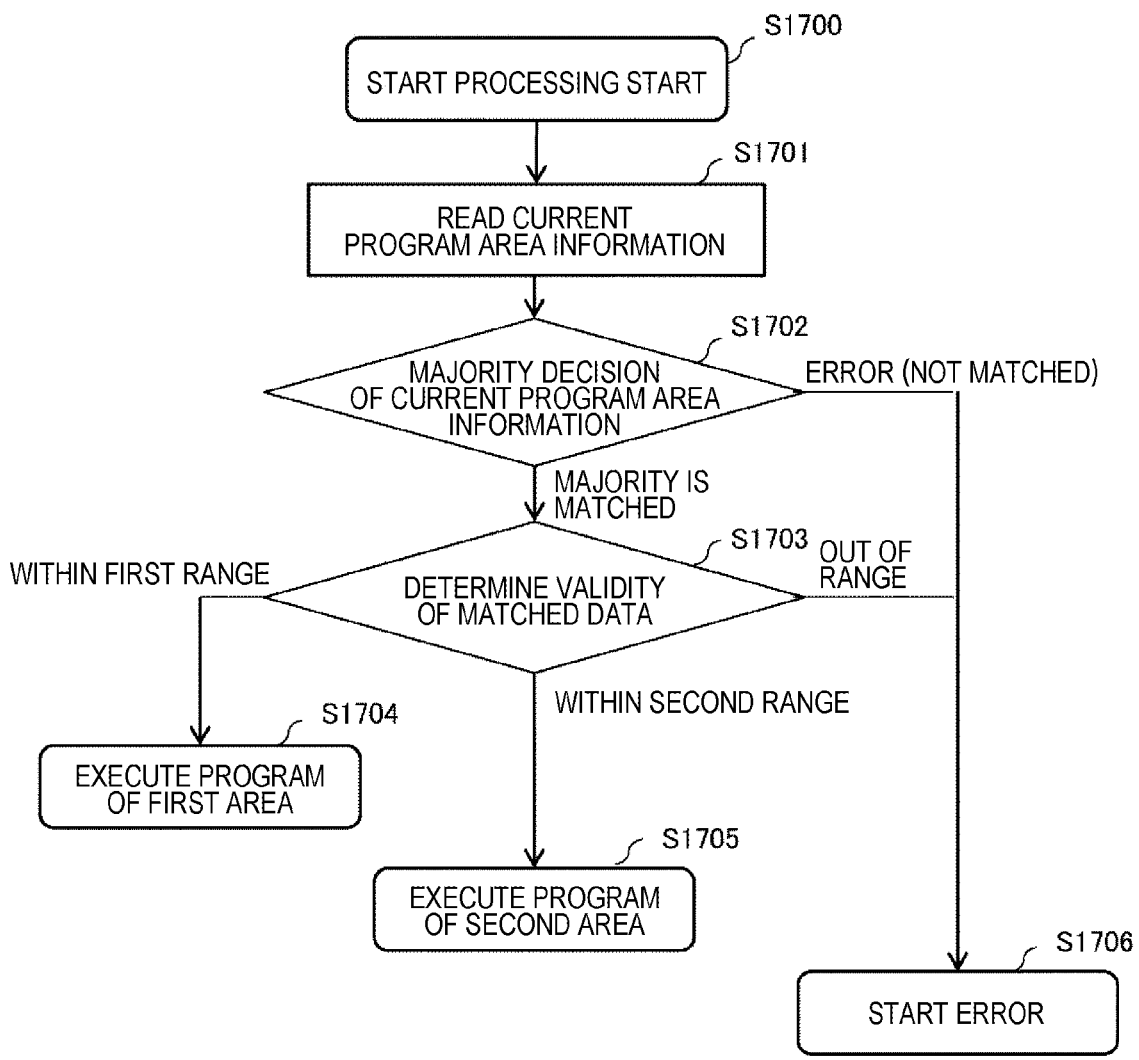
FIG. 17 is a flowchart showing an example of processing for starting a control program, which is executed in a vehicle control device.

FIG. 17 is a flowchart showing an example of an operation (start processing S1700) of the start program 1121. Each step of FIG. 17 will be described below.

For example, when the operation unit 111 detects that the ignition has been started by an interrupt signal or the like, the operation unit 111 executes the start program 1121 and starts the processing shown in the present flowchart.

The operation unit 111 reads the current program area information stored in the plurality of management data areas 1123a, 1123b, and 1123c (S1701).

The operation unit 111 performs the majority decision of the current program area information and determines data where the majority of the current program area information has been matched as correct information (majority decision processing S1702). Next, the operation unit 111 performs the validity determination of the current program area information determined as the correct information by the majority decision (validity determination processing S1703). The details of the majority decision processing S1702 and the validity determination processing S1703 are the same as those in the majority decision processing S8012 and the validity determination processing S8013 shown in FIGS. 10 and 11.

When a result of the validity determination processing S1703 is normal and the "first area", the operation unit 111 executes the control program stored in the first area (S1704). When the result of the validity determination processing S1703 is normal and the "second area", the operation unit 111 executes the control program stored in the second area (S1705).

When the result of each of the majority decision processing S1702 and the validity determination processing S1703 is an error, a start error is determined (S1706).

As described above, the vehicle control device 11 according to the present embodiment has the flash ROM 112 and the operation unit 111. The flash ROM 112 has the first area 1124 and the second area 1125 for storing the control program executable by the operation unit 111 and the plurality of management data areas 1123a, 1123b, and 1123c for storing the management data including the current program area information representing one storage area of the first area 1124 and the second area 1125 as the storage area storing the current control program to be executed by the operation unit 111. In this way, even if one management data is destroyed, it is possible to determine the storage area storing the current control program using other management data.

Therefore, erroneous execution and update of a plurality of control programs stored in the flash ROM 112 can be effectively suppressed.

<With Respect to Modifications>

The present invention is not limited to the embodiments described above and various modifications are included. For example, the embodiments are described in detail to facilitate the understanding of the present invention and are not limited to including all of the described configurations. Further, a part of the configurations of the certain embodiment can be replaced by the configurations of other embodiments or the configurations of other embodiments can be added to the configurations of the certain embodiment. Further, for a part of the configurations of the individual embodiments, addition of other configurations, configuration removal, and configuration replacement can be performed.

In the embodiment described above, the configuration having the flash ROM 112 as the nonvolatile memory for storing the control program has been used. However, the present invention is not limited thereto. For example, other rewritable nonvolatile storage device such as an electrically erasable programmable read-only memory (EEPROM) may be used.

Further, in the embodiment described above, the configuration example in which the first area 1124 and the second area 1125 are provided in one flash ROM 112 has been described. However, the present invention can be realized by disposing the first area 1124 in one of storage devices such as two flash ROMs and disposing the second area 1125 in the other, for example. Further, the same configuration as the embodiment can be realized by providing three or more storage areas for storing the control program. In this configuration, at the time of updating the control program, for example, the control program may be written (overwritten) to each storage area (or a storage device) in cyclic order.

Further, in the embodiment described above, the configuration in which only the current program area information representing the storage area where the current control program is stored is included in the management data stored in the management data areas 1123a, 1123b, and 1123c has been described. However, the present invention is not limited thereto.

Figure 18:
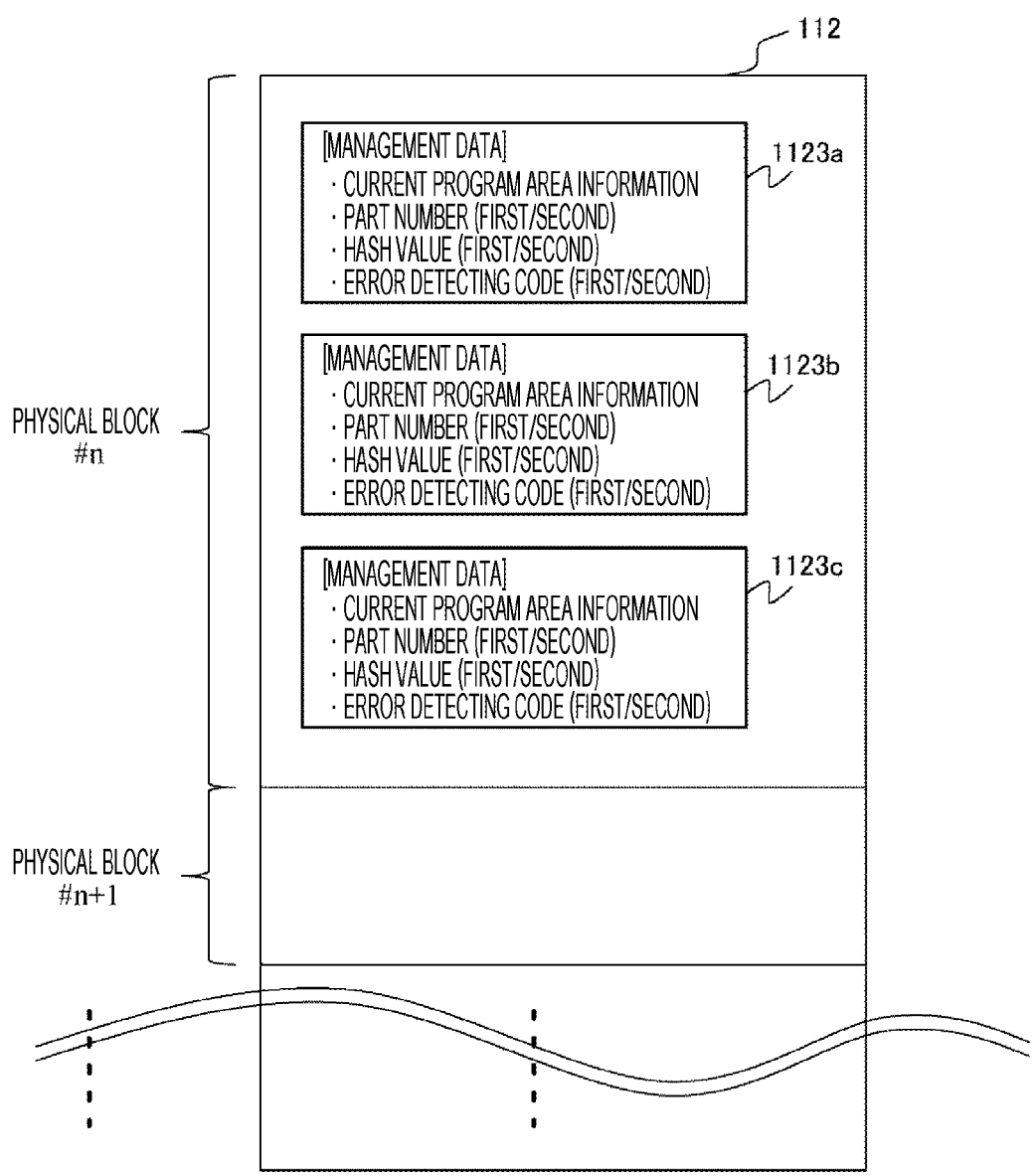
FIG. 18 is a diagram showing a configuration example of management data having a plurality of pieces of information including current program area information.

For example, the management data may include other information in addition to the current program area information. Another configuration example of the management data is shown in FIG. 18. In this example, the management data may include a part number of a control program or a hash value or a checksum value used for checking the validity of the stored control program, in addition to the current program area information.

Further, in the embodiment described above, the configuration in which the current program area information representing the storage area where the current control program is stored is included in the management data stored in the management data areas 1123a, 1123b, and 1123c has been described. However, for example, when there are two storage areas (the first area 1124 and the second area 1125) for storing the control program, a configuration in which information showing a storage area of the write destination of a new control program at the time of updating the control program is included in the management data may be used. In this configuration, a storage area other than the storage area of the write destination of the new control program can be regarded as a storage area for storing the current control program and it can be treated in the same manner as the current program area information.

Further, in the embodiment described above, the configuration having the three management data areas 1123a, 1123b, and 1123c has been used. However, the present invention is not limited thereto. For example, a configuration having only one management data area may be used. In this configuration, only when a value of the current program area information of the management data area is a normal value (that is, a value representing any one of the first area 1124 and the second area 1125), it is determined that the current program area information represents the area storing the current control program and execution of the control program or update of the control program is performed. When the value is not the normal value, an alarm such as an error is issued. In this way, it can be determined that the value of the current program area information has been rewritten with an abnormal value (value not representing the first area 1124 and the second area 1125) for some reason.

Further, in the control program update processing, a latest version control program is generally written. However, depending on various circumstances, the program may be updated with a control program of a version older than the version of the current control program. In this case, a new control program for update is the old version control program. That is, an updated version control program refers to a control program written by a previous update sequence.

Further, a part of the individual configurations, functions, processing units, and processing mechanisms may be designed by integrated circuits and may be realized by hardware. Further, the individual configurations and functions may be realized by software by analyzing programs for realizing the functions by a processor and executing the programs by the processor. Information such as programs, tables, and files for realizing the individual functions can be stored in a recording device such as a memory, a hard disk, and a solid state drive (SSD) and a recording medium such as an IC card, an SD card, and a DVD.

REFERENCE SIGNS LIST 1 vehicle
2 server
3 Internet line
4 wireless base station
5 update package
11 vehicle control device
12 gateway (program write device)
13 in-vehicle network
14 HMI
1121 start program
1122 rewrite program
1123a, 1123b, 1123c management data area (management data storage area)
1124 first area (storage area)
1125 second area (storage area)
1126 majority decision program
1127 validity determination program

The invention claimed is:

1. A program update system, comprising:
a vehicle control device which is mounted on a vehicle, the vehicle control device having a rewritable nonvolatile memory and an operation unit, the nonvolatile memory having a first storage area and a second storage area which store a control program executable by the operation unit and a plurality of management data storage areas which store management data including current program area information representing whether a storage area storing a current control program to be executed by the operation unit is the first storage area or the second storage area;
a program write device which is mounted on the vehicle, is connected to the vehicle control device via an in-vehicle network, and controls updating of the control program of the vehicle control device; and
a server which distributes an update package including a control program for update in the vehicle control device to the program write device via wireless communication,
wherein the program write device transmits an identification number representing the current control program and the current program area information to the server, and
wherein the server distributes the update package selected on the basis of the identification number and the current program area information transmitted from the program write device, and
wherein the update package includes
the identification number representing the current control program,
the current program area information,
an identification number representing the control program for update, and
information representing whether a storage area storing the control program for update is the first storage area or the second storage area.

2. The program update system according to claim 1, wherein, only when the identification number and the current program area information transmitted to the server and the identification number and the current program area information included in the update package received from the server are matched, respectively, the program write device executes update processing of the control program of the vehicle control device.

3. The program update system according to claim 1, wherein, when it is determined that the control program for update included in the update package is normally written to the nonvolatile memory of the vehicle control device and the vehicle is stopping, the program write device transmits, to the vehicle control device, a request to switch the current program area information to a value representing a storage area to which the control program for update has been written.

4. The program update system according to claim 3, wherein, when it is determined that the control program for update included in the update package is normally written to the nonvolatile memory of the vehicle control device and the vehicle is not stopping, the program write device executes processing for prompting the vehicle to stop.

5. The program update system according to claim 1, wherein the plurality of management data storage areas are arranged one by one in a plurality of different rewrite unit blocks of the nonvolatile memory.

6. The program update system according to claim 1, wherein the operation unit reads the current program area information from each of the plurality of management data storage areas, compares the current program area information, and determines the current program area information of majority matching or most matching as the current program area information representing the storage area storing the current control program.

7. The program update system according to claim 6, wherein the operation unit transmits the current program area information determined as representing the storage area storing the current control program to the program write device.

8. The program update system according to claim 1, wherein the operation unit reads the current program area information from the plurality of management data storage areas and compares the current program area information, and when the current program area information of majority matching or most matching represents any one of the first storage area and the second storage area, the operation unit determines that the current program area information represents the storage area storing the current control program.

9. The program update system according to claim 8, wherein the operation unit executes the control program stored in the storage area represented by the current program area information determined as representing the storage area storing the current control program.

10. The program update system according to claim 1, wherein, when the operation unit receives a switching request of the control program, the operation unit confirms a validity of the control program stored in a storage area of a switching destination included in the request, and when the validity is confirmed, the operation unit rewrites the current program area information stored in all of the plurality of management data storage areas with a value representing the storage area of the switching destination.

11. A program write device which is mounted on a vehicle, is connected to a vehicle control device via an in-vehicle network, and controls updating of a control program of the vehicle control device, comprising:
wherein the vehicle control device is mounted on the vehicle, the vehicle control device having a rewritable nonvolatile memory and an operation unit, the nonvolatile memory having a first storage area and a second storage area which store a control program executable by the operation unit and a plurality of management data storage areas which store management data including current program area information representing whether a storage area storing a current control program to be executed by the operation unit is the first storage area or the second storage area, and,
wherein the program write device transmits an identification number representing the current control program and the current program area information to a server, and wherein the server distributes an update package selected on the basis of the identification number and the current program area information transmitted from the program write device, and
wherein the program write device receives the update package including an identification number representing the current control program, the current program area information, an identification number representing the control program for update, and information representing whether a storage area storing the control program for update is the first storage area or the second storage area, from the server.

12. The program write device according to claim 11, wherein, only when the identification number and the current program area information transmitted to the server and the identification number and the current program area information included in the update package received from the server are matched, respectively, the program write device executes update processing of the control program of the vehicle control device.

* * * * *